United States Patent
Morin

(10) Patent No.: US 9,527,169 B2
(45) Date of Patent: Dec. 27, 2016

(54) PROCESS AND APPARATUS FOR COOLING A METAL PART DURING A WELDING OPERATION

(75) Inventor: James Morin, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 3424 days.

(21) Appl. No.: 11/711,841

(22) Filed: Feb. 27, 2007

(65) Prior Publication Data

US 2008/0271876 A1    Nov. 6, 2008

(51) Int. Cl.
*F28D 15/00* (2006.01)
*B23P 6/00* (2006.01)
*B23K 37/00* (2006.01)
*F01D 5/00* (2006.01)

(52) U.S. Cl.
CPC .............. *B23P 6/002* (2013.01); *B23K 37/003* (2013.01); *F01D 5/005* (2013.01); *B23K 2201/001* (2013.01); *F05D 2230/232* (2013.01); *F05D 2230/64* (2013.01); *F05D 2230/80* (2013.01)

(58) Field of Classification Search
CPC ....................................................... F28D 15/00
USPC .......... 29/889.1, 889.72; 165/104.19, 104.21
See application file for complete search history.

(56) References Cited

U.S. PATENT DOCUMENTS

| | | | | |
|---|---|---|---|---|
| 5,350,240 A | * | 9/1994 | Billman et al. | 383/104 |
| 5,832,697 A | * | 11/1998 | Rogers | 53/440 |
| 5,993,593 A | | 11/1999 | Swartz et al. | |
| 6,139,412 A | * | 10/2000 | Dwyer | 451/365 |
| 6,158,955 A | * | 12/2000 | Caddell et al. | 415/115 |
| 6,332,272 B1 | | 12/2001 | Sinnott et al. | |
| 6,376,801 B1 | | 4/2002 | Farrell et al. | |
| 6,469,271 B1 | | 10/2002 | McGoey | |
| 6,494,677 B1 | * | 12/2002 | Grady | 415/209.4 |
| 6,568,077 B1 | | 5/2003 | Hellemann et al. | |
| 7,286,355 B2 | * | 10/2007 | Cheon | 361/699 |
| 7,536,783 B2 | * | 5/2009 | Davis et al. | 29/889.1 |
| 2003/0075587 A1 | | 4/2003 | Smashey et al. | |
| 2006/0240504 A1 | * | 10/2006 | Gillis et al. | 435/31 |
| 2006/0275119 A1 | | 12/2006 | Liang | |
| 2007/0267109 A1 | * | 11/2007 | Kelly et al. | 148/516 |

* cited by examiner

*Primary Examiner* — Dana Ross
*Assistant Examiner* — Ayub Maye

(57) ABSTRACT

A process and apparatus are provided for cooling an airfoil of a blade during a welding repair operation on the airfoil. At least one polymeric pouch is positioned adjacent a surface of the airfoil, and a coolant fluid is passed through the polymeric pouch during the repair operation on the airfoil.

20 Claims, 4 Drawing Sheets

PROCESS AND APPARATUS FOR COOLING A METAL PART DURING A WELDING OPERATION

FIELD OF THE INVENTION

The present invention relates to a process and apparatus for cooling a metal part such as a gas turbine blade during a welding operation.

BACKGROUND OF THE INVENTION

A conventional combustible gas turbine engine includes a compressor, a combustor, and a turbine. The engine further comprises an outer casing which defines an outer section for each of the compressor, combustor and turbine. The compressor compresses ambient air. The combustor combines the compressed air with a fuel and ignites the mixture creating combustion products defining a working gas. The working gas travels to the turbine. Within the turbine section of the outer casing are a series of rows of stationary vanes and rotating blades. Each pair of rows of vanes and blades is called a stage. Typically, there are four stages in a turbine. The rotating blades are coupled to a shaft and disc assembly. As the working gas expands through the turbine, the working gas causes the blades, and therefore the shaft and disc assembly, to rotate.

Typically, turbine blades comprise a root, a platform and an airfoil that extends outwardly from the platform. The airfoil is ordinarily composed of an outer end or tip, a leading edge, a trailing edge, a concave pressure side and a convex suction side. Side walls are integrally formed together to define the pressure and suction sides and the leading and trailing edges of the airfoil. The tip may be defined by a squealer portion and a cap. Outer ends of the side walls form a raised lip extending around an outer periphery of the airfoil. The raised lip defines the airfoil squealer portion. Notches are formed in the side walls just below the squealer portion. The cap is defined by one or more plates received in the notches. Brazing material is employed to hold the plates in the notches.

During operation of the gas turbine engine, the airfoil tips wear due to engagement with the outer casing. Also one or more cracks may develop near an airfoil tip due to fatigue stresses imparted on the tip during the operation of the turbine engine. Airfoil tip wear may be repaired by machining off the squealer portion, the cap and any braze material provided to secure the cap plate(s) to the airfoil side walls. If a crack is present, the material adjacent the crack is also removed so as to form a crack repair volume, which is filled by welding, see U.S. Pat. No. 6,332,272 B1 (hereinafter the '272 patent), the entire disclosure of which is incorporated herein by reference. A replacement cap is welded to the machined outer ends of the airfoil side walls, see the '272 patent. A replacement squealer portion may then be welded to the replacement cap and the outer ends of the airfoil side walls, see the '272 patent.

It is known to use liquid-cooled metal chill blocks to cool an airfoil during airfoil tip welding repair operations. By cooling the airfoil during one or more welding repair operations, the chills blocks reduce the possibility that a thermally induce crack may form in the blade during the repair operation. The chill blocks are traditionally formed from cast aluminum or copper metal blocks. The cast metal blocks are machined to match the contour of the blade surfaces. Casting and machining metal blocks to form a chill block for each blade design is costly and, hence, disadvantageous.

Accordingly, there is a need for an improved process and apparatus for cooling an airfoil of a blade during a welding repair operation.

SUMMARY OF THE INVENTION

In accordance with a first aspect of the present invention, an apparatus is provided for cooling a metal part during a welding operation. The apparatus comprises at least one polymeric pouch and a cooling system. The polymeric pouch is configured so as to be positioned adjacent a surface of the metal part and is capable of receiving a coolant fluid. The cooling system is adapted to circulate the coolant fluid through the polymeric pouch such that energy in the form of heat is transferred from the metal part during a welding operation, through the pouch to the coolant fluid.

The cooling system may comprise a chiller unit and a conduit structure extending from the chiller unit to the polymeric pouch. The conduit structure defines a path for the coolant fluid to travel from the chiller unit to the polymeric pouch and, after passing through the pouch, back to the chiller unit. The chiller unit is adapted to remove energy in the form of heat from the coolant fluid.

The apparatus may further comprise a support structure comprising a base adapted to rest on a platform of a blade defining the metal part and at least one shelf for supporting the pouch. The support structure may further comprise a shield position near a tip of an airfoil of the blade to protect the polymeric pouch during a welding repair operation on the tip.

First and second polymeric pouches may be provided, which are adapted to be positioned on opposing side surfaces of the airfoil. The first and second pouches are associated with the cooling system.

The support structure may support respectively the first and second pouches on first and second shelves. The first shelf may have a curved surface having a contour that follows the contour of a corresponding first side surface of the airfoil and the second shelf may have a curved surface having a contour that follows the contour of a corresponding second side surface of the airfoil.

The support structure may further comprise structure for coupling the base, the first and second shelves and the shield to one another.

The apparatus may further comprise structure, such as tape or a cord, for connecting the first polymeric pouch to at least one of the first shelf and the coupling structure and the second polymeric pouch to at least one of the second shelf and the coupling structure.

In accordance with a second aspect of the present invention, a process is provided for cooling an airfoil of a blade during a welding repair operation on the airfoil. The process comprises positioning at least one polymeric pouch adjacent a surface of the airfoil, and passing a coolant fluid through the polymeric pouch during the repair operation on the airfoil.

The positioning of at least one polymeric pouch adjacent a surface of the airfoil comprises: providing a support structure comprising a base and at least one shelf for supporting the at least one polymeric pouch; positioning the base of the support structure on a platform of the blade; and positioning the at least one polymeric pouch on the shelf and adjacent the surface of the airfoil.

The passing of a coolant fluid through the polymeric pouch may comprise providing a chiller unit; providing conduit structure extending from the chiller unit to the polymeric pouch for defining a path for the coolant fluid to travel from the chiller unit to the polymeric pouch and, after passing through the pouch, back to the chiller unit; and circulating coolant fluid through the chiller unit, the conduit structure and the polymeric pouch.

The process may further comprise providing a shield near a tip of the airfoil to protect the at least one polymeric pouch during the welding repair operation.

In accordance with a third aspect of the present invention, a process is provided for performing a welding operation on a metal part. The process comprises positioning at least one polymeric pouch adjacent a surface of the metal part; passing a coolant fluid through the polymeric pouch; and effecting a welding operation on the metal part.

The positioning of at least one polymeric pouch adjacent a surface of the metal part may comprise positioning first and second polymeric pouches on opposing first and second side surfaces of an airfoil of a blade.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

A combustible gas turbine engine (not shown) includes a compressor (not shown), a combustor (not shown), and a turbine (not shown). The engine further comprises an outer casing (not shown) which defines an outer section for each of the compressor, combustor and turbine. The compressor compresses ambient air. The combustor combines the compressed air with a fuel and ignites the mixture creating combustion products defining a working gas. The working gas travels to the turbine. Within the turbine section of the outer casing are a series of rows of stationary vanes and rotating blades. Each pair of rows of vanes and blades is called a stage. Typically, there are four stages in a turbine. The rotating blades are coupled to a shaft and disc assembly. As the working gas expands through the turbine, the working gas causes the blades, and therefore the shaft and disc assembly, to rotate.

Figure 4:
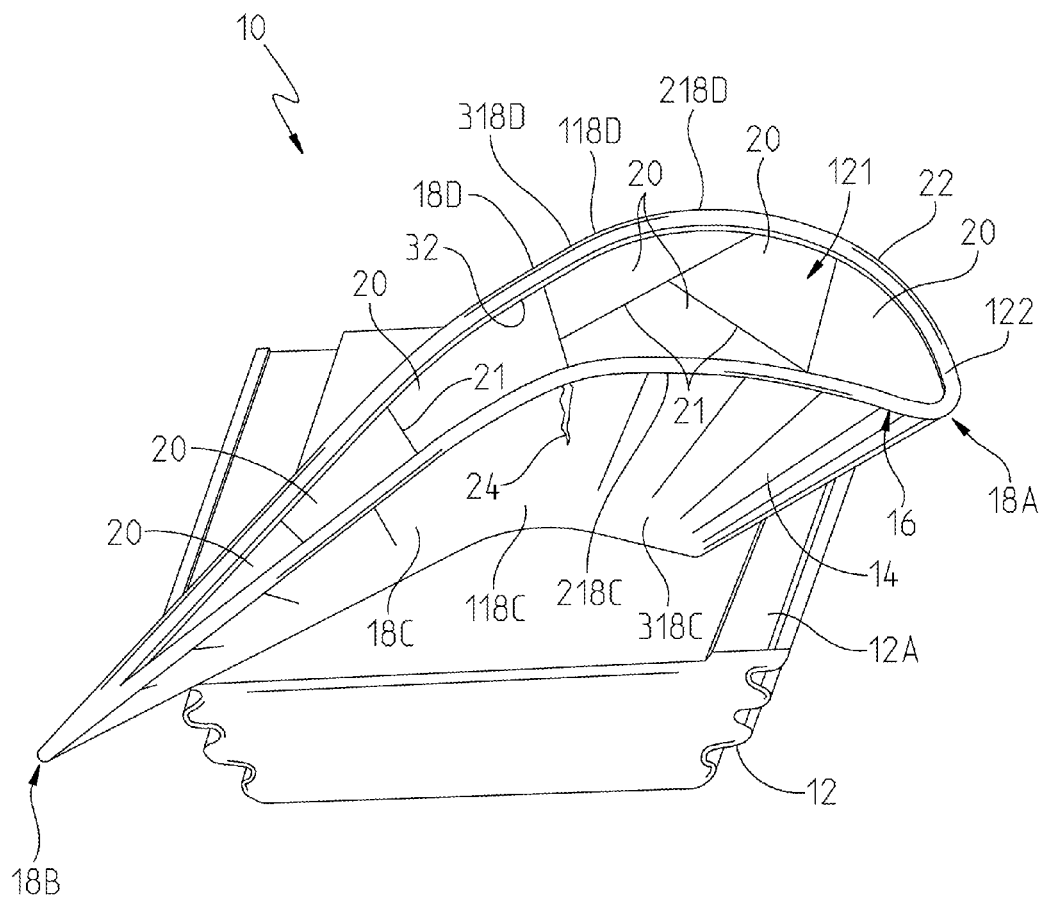
FIG. 4 is a perspective view of an example blade which may be cooled in accordance with the present invention during a repair operation on a tip of the blade.

An example turbine blade 10 is illustrated in FIG. 4. The blade 10 comprises a root 12, a platform 12A and an airfoil 14 that extends outwardly from the platform 12A. The airfoil 14 comprises an outer end or tip 16, a leading edge 18A, a trailing edge 18B, a concave pressure side 18C and a convex suction side 18D. First and second side walls 118C and 118D, respectively, are integrally formed together to define the pressure and suction sides 18C and 18D and the leading and trailing edges 18A and 18B of the airfoil 14. The tip 16 may be defined by a squealer portion 22 and a cap 121. Outer ends 218C and 218D of the side walls 118C and 118D form a raised lip 122 extending around an outer periphery of the airfoil 14. The raised lip 122 defines the airfoil squealer portion 22. Notches 32 are formed in the side walls 118C and 118D just below the squealer portion 22. The cap 121 is defined by one or more plates 20 received in the notches 32. Brazing material 21 is employed to couple the plates 20 to one another and secure the plates 20 in the notches 32.

During operation of the gas turbine engine, the airfoil tips 16 wear due to engagement with an inner surface (not shown) of the outer casing. Also one or more cracks 24, see FIG. 4, may develop near an airfoil tip 16 due to fatigue stresses imparted on the tip during the operation of the turbine engine. Airfoil tip wear may be repaired during a welding repair operation by machining off the squealer portion 22, the cap 121 and any brazing material 21 provided to secure the cap plates 20 to the airfoil side walls. If a crack 24 is present, the material adjacent the crack may also be removed so as to form a crack repair volume, which is filled by welding, see U.S. Pat. No. 6,332,272 B1, the entire disclosure of which has previously been incorporated herein by reference. A replacement cap (not shown) may be welded to the machined outer ends of the airfoil side walls 118C and 118D, see the '272 patent. A replacement squealer portion (not shown) may then be welded to the replacement cap and the outer ends of the airfoil side walls 118C and 118D, see the '272 patent. The airfoil 14 may be cast from a cast nickel-based super alloy such as IN-738LC. The blade 10 is typically removed from the turbine and the shaft and disc assembly (not shown) to which it is coupled prior to the welding repair operation.

In accordance with a first embodiment of the present invention, cooling apparatus 100 is provided for cooling an airfoil, such as the airfoil 14 illustrated in FIG. 4, during a welding repair operation. The blade 10 having the shape illustrated in FIG. 4 is presented for illustration purposes only. Hence, the cooling apparatus 100 may be used with blades having different shapes.

The cooling apparatus 100 comprises first and second pouches 110 and 120. Each pouch 110, 120 may be formed from two polymeric sheets cut or formed to a desired size and shape. Preferably, the polymeric sheets are formed from a high temperature polymer so as to withstand high temperatures, e.g., at least about 500 degrees F. Example polymers include liquid crystal polymers such as those disclosed in U.S. Pat. No. 5,993,593, the entire disclosure of which is incorporated by reference herein. The two polymeric sheets may be joined to one another along outer edges via heat sealing or other welding operations. The joined sheets of each pouch 110, 120 define an inner cavity adapted to receive a coolant fluid. Fittings 110A and 110B extend through one sheet defining the first pouch 110 so as to allow the coolant fluid to enter and exit the first pouch 110. Fittings 120A and 120B extend through one sheet defining the second pouch 120 so as to allow the coolant fluid to enter and exit the second pouch 120.

The cooling apparatus 100 further comprises a cooling system 130 including a chiller unit 132 and conduit structure 134. The conduit structure 134 is coupled to the chiller unit 132 and the first and second pouches 110 and 120. In the illustrated embodiment, the conduit structure 134 comprises first and second supply lines 134A and 134B and first and second return lines 134C and 134D. The first supply line 134A and the first return line 134C are coupled to corresponding fittings 110A and 110B extending from the first pouch 110. The second supply line 134B and the second return line 134D are coupled to corresponding fittings 120A and 120B extending from the second pouch 120. The first supply lines 134A and 134B are also coupled to the chiller unit 132 and define paths for a chilled coolant fluid, such as water, to travel from the chiller unit 132 to the first and second pouches 110 and 120. The coolant fluid, which may be heated by the blade 14 during a welding repair operation, travels from the first and second pouches 110 and 120, through the first and second return lines 134C and 134D to chiller unit 132, wherein energy in the form of heat is removed from the coolant fluid, i.e., the coolant fluid is chilled or cooled by the chiller unit 132. A pump 132A is provided in the chiller unit 132 to cause the coolant fluid to move from the chiller unit 132 to the first and second pouches 110 and 120 via the supply lines 134A and 134B and from the first and second pouches 110 and 120 to the chiller unit 132 via the first and second return lines 134C and 134D.

The first pouch 110 is sized to fit against an upper section 318A of an outer side surface 318C of the first side wall 118C and just below the tip 16 of the airfoil 14. Likewise, the second pouch 120 is sized to fit against an upper section 318B of an outer side surface 318D of the second side wall 118D and just below the tip 16 of the airfoil 14. First and second elastic cords 140 and 142 are positioned about the airfoil 14 and the first and second pouches 110 and 120 so as to maintain the first and second pouches 110 and 120 positioned adjacent to and engaged with the upper sections 318A and 318B of the outer surfaces 318C and 318D of the first and second side walls 118C and 118D of the airfoil 14.

During a welding repair operation on the airfoil tip 16, energy in the form of heat is transferred from the first and second airfoil side walls 118C and 118D through the pouches 110 and 120 to the coolant fluid circulating through the pouches. Energy in the form of heat is then removed from the heated coolant fluid via the chiller unit 132. Hence, during an airfoil welding repair operation, the cooling apparatus 100 functions to reduce the possibility that a thermally induce crack may form in the airfoil 14 during the repair operation. Because the first and second pouches 110 and 120 are formed from a polymeric material, it is believed that the cooling apparatus 100 of the present invention is less costly to produce than prior art cooling apparatuses including chill blocks formed from cast aluminum or copper metal blocks.

Figure 1:
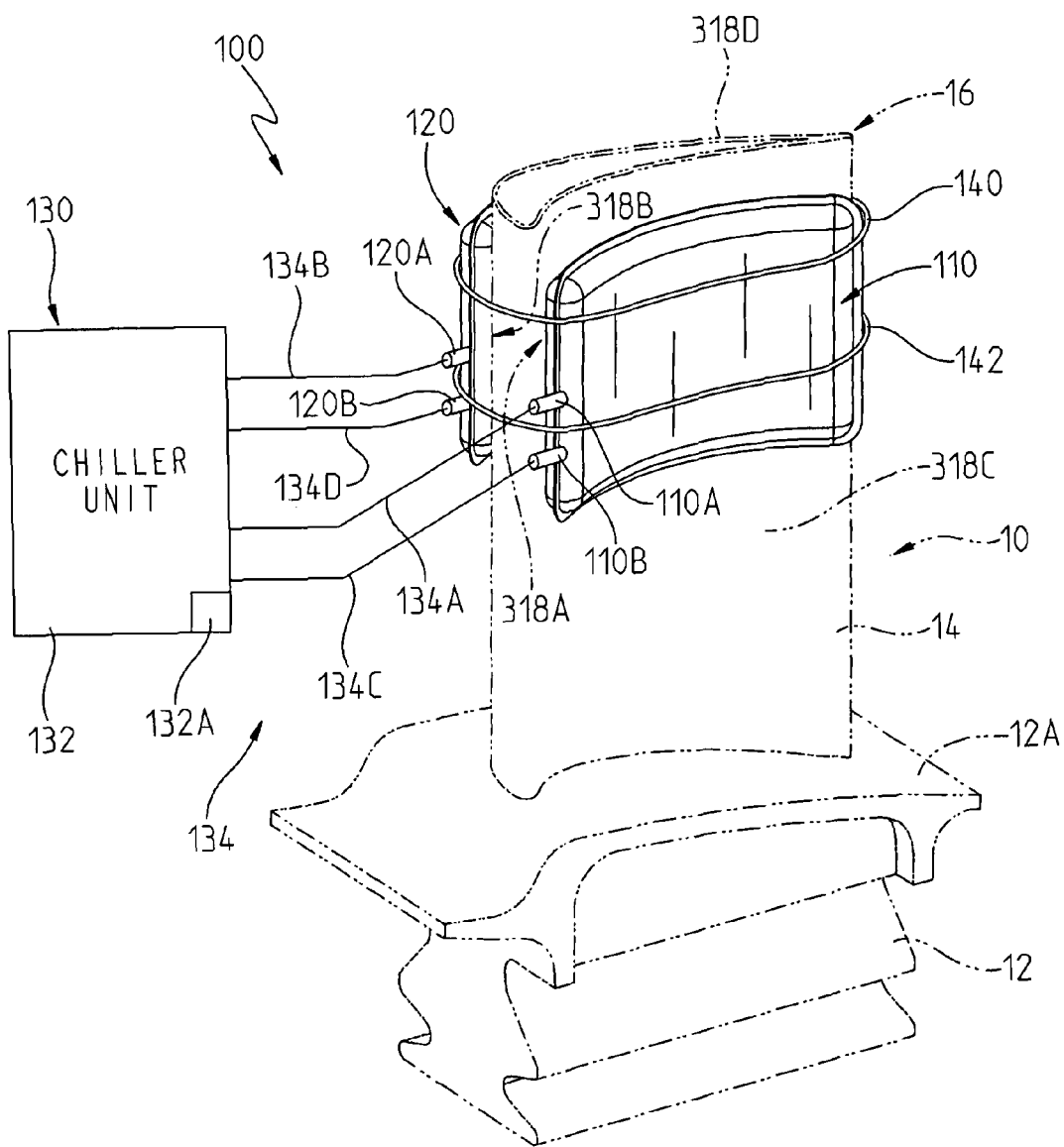
FIG. 1 is a perspective view illustrating first and second pouches, a chiller unit and conduit structure extending from the chiller unit to the pouches, wherein the pouches cool side surfaces of an airfoil, shown in phantom, during a welding repair operation.
Figure 2:
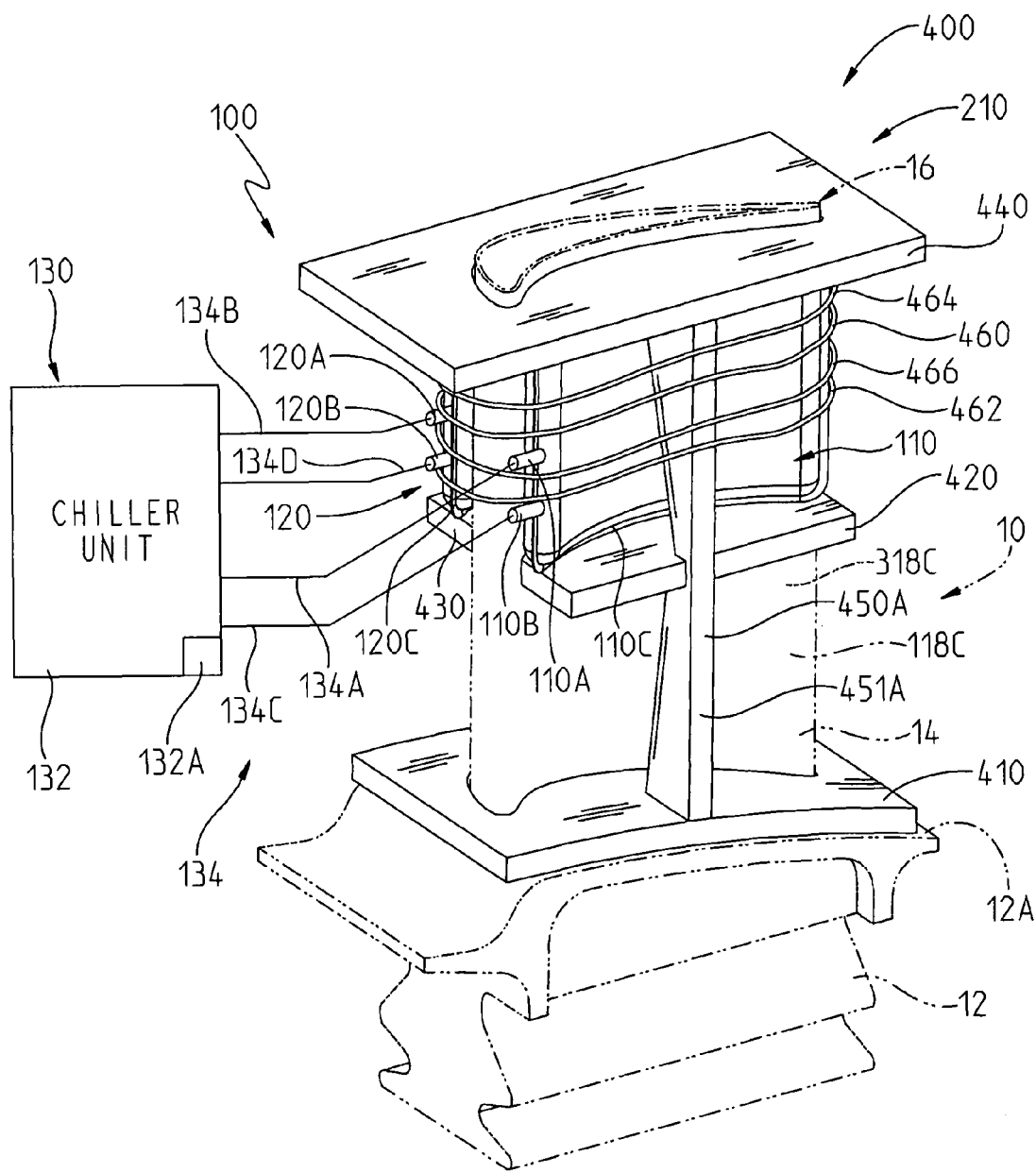
FIG. 2 is a perspective view illustrating first and second pouches, support structure for the pouches, cords for coupling the pouches to the support structure, a chiller unit and conduit structure extending from the chiller unit to the pouches, wherein the pouches cool side surfaces of an airfoil, shown in phantom, during a welding repair operation.
Figure 3:
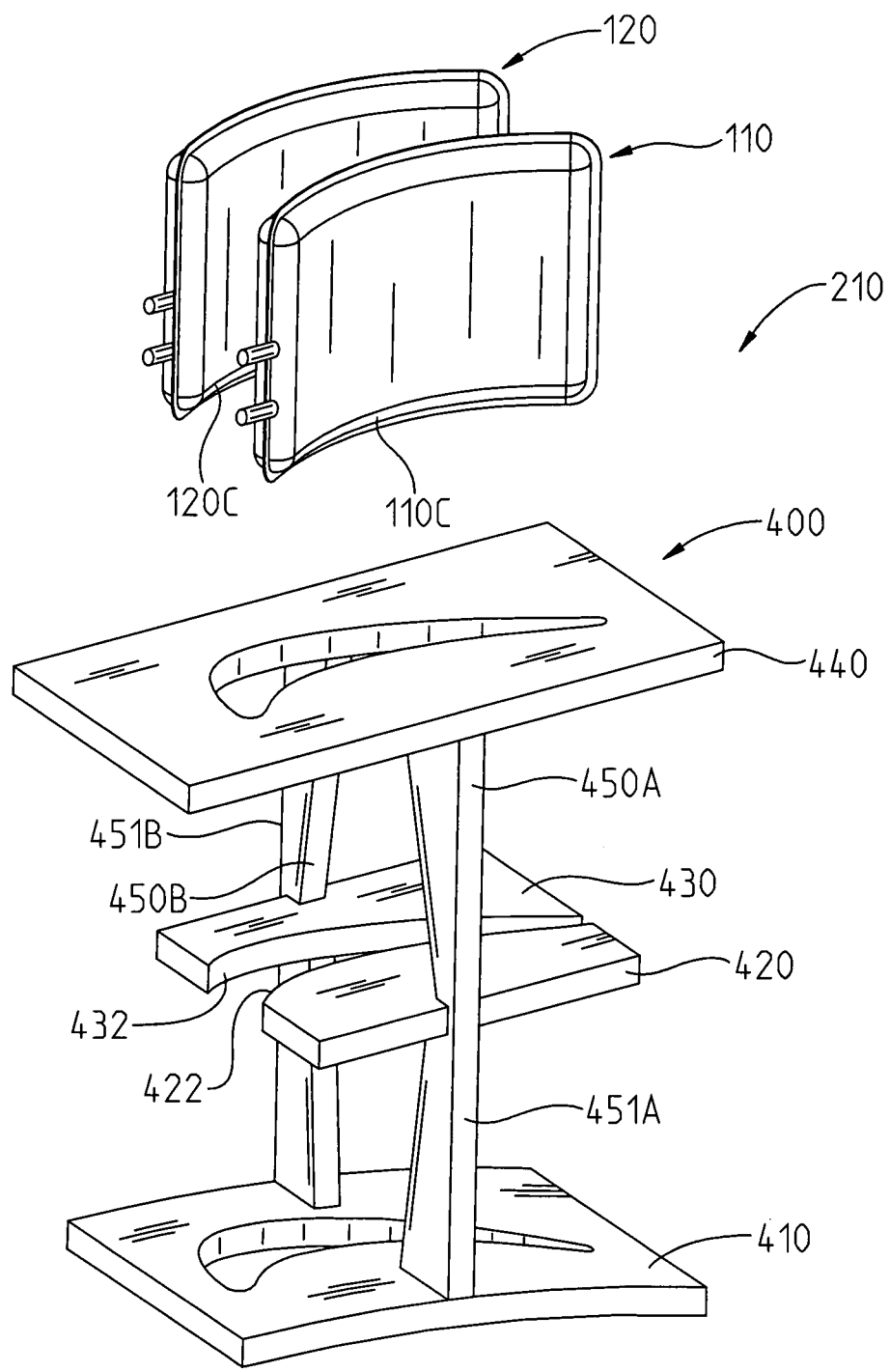
FIG. 3 is an exploded view of the first and second pouches and the support structure illustrated in FIG. 2.

A cooling apparatus 210, constructed in accordance with a second embodiment of the present invention, is illustrated in FIGS. 2 and 3, wherein like reference numerals indicate like elements. The cooling apparatus 210 comprises first and second pouches 110 and 120 and a cooling system 130, which are constructed in the same manner as the first and second pouches 110, 120 and the cooling system 130 illustrated in FIG. 1 and discussed above. The cooling apparatus 210 further comprises a support structure 400 including a base 410 adapted to rest on the platform 12A of the blade 10. The support structure 400 further comprises a first shelf 420 for supporting the first pouch 110 and a second shelf 430 for supporting the second pouch 120. A base portion 110C of the first pouch 110 rests on the first shelf 420 and a base portion 120C of the second pouch 120 rests on the second shelf 430, see FIG. 2. The support structure 400 further comprises a shield 440 positioned relative to the base 410 so as to be located near the tip 16 of the airfoil 14 when the support structure 400 is positioned over the blade 10. The shield functions to protect the polymeric first and second pouches 110 and 120 from hot metal and the like generated during a welding repair operation on the tip 16. As illustrated in FIGS. 2 and 3, the first and second shelves 420 and 430 have inner surfaces 422 and 432, respectively, provided with a contour or shape similar to the corresponding contours or shapes of the outer surfaces 318C and 318D of the first and second side walls 118C and 118D of the airfoil 14.

The support structure 400 additionally comprises first and second supports 450A and 450B coupled to the base 410, the first and second shelves 420 and 430 and the shield 440, such as by an adhesive, bolts or like fasteners. It is also contemplated that the support structure 400 may be injection molded from a polymeric material.

In the illustrated embodiment, the first pouch 110 is maintained in position against the upper section 318A of the outer surface 318C of the first side wall 118C and in position on the first shelf 420 via first, second, third and fourth elastic cords 460, 462, 464 and 466. Also in the illustrated embodiment, the second pouch 120 is maintained in position against the upper section 318B of the outer surface 318D of the second side wall 118D and in position on the second shelf 430 via the first, second, third and fourth elastic cords 460, 462, 464 and 466. The cords 460, 462, 464, 466 extend around the airfoil 14, an outer surface 451B of the second support 450B, see FIG. 3, an outer surface 451A of the first support 450A and the first and second pouches 110 and 120, see FIG. 2. It is contemplated that one, two, three or more than four cords could be used instead of the four cords provided in the embodiment illustrated in FIG. 2. It is also contemplated that one or more shims (not shown) may be inserted between the first pouch 110 and the first support 450A so as force the first pouch 110 toward the outer surface 318C of the first side wall 118C. One or more shims (not shown) may also be inserted between the second pouch 120 and the second support 450B so as force the second pouch 120 toward the outer surface 318D of the second side wall 118D.

Prior to a welding repair operation, the support structure 400 is slipped over the airfoil 14 such that the base 410 is positioned on the blade platform 12A, see FIG. 2. The first and second pouches 110 and 120 are then positioned on the shelves 420 and 430 between the airfoil 14 and the first and second supports 450A and 450B. Thereafter, the cords 460, 462, 464 and 466 are positioned about the first and second pouches 110 and 120 and the first and second supports 450A and 450B.

During a welding repair operation on the airfoil tip 16 involving the cooling apparatus 210, energy in the form of heat is transferred from the first and second airfoil side walls 118C and 18D through the pouches 110 and 120 to the coolant fluid circulating through the pouches 110 and 120. Energy in the form of heat is then removed from the heated coolant fluid via the chiller unit 132. Hence, during an airfoil welding repair operation, the cooling apparatus 210 functions to reduce the possibility that a thermally induce crack may form in the airfoil 14 during the repair operation. Because the first and second pouches 110 and 120 are formed from a polymeric material, it is believed that the cooling apparatus 210 of the present invention is less costly to produce than prior art cooling apparatuses including chill blocks formed from cast aluminum or copper metal blocks.

Tape, string or the like may be substituted for the elastic cords 140, 142, 460, 462, 464 and 466.

A welding repair operation on the tip 16 of the airfoil 14 may be effected in the manner set out in U.S. Pat. No. 6,332,272 B1, the entire disclosure of which has previously been incorporated herein by reference.

It is also contemplated that a polymeric pouch, such as one of the first and second pouches 110, 120 illustrated in FIGS. 1-3 or a polymeric pouch of a different shape and/or size could be used to cool any metal part other than a blade airfoil during a welding operation on that part. An example metal part other than a blade is a vane used in a gas turbine engine.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for cooling a metal part during a welding operation comprising:
   at least one polymeric pouch configured so as to be positioned adjacent a surface of the metal part and capable of receiving a coolant fluid; and
   a cooling system adapted to circulate the coolant fluid through said at least one polymeric pouch such that energy in a form of heat is transferred from the metal part during a welding repair operation, through said at least one polymeric pouch to said coolant fluid.

2. The apparatus of claim 1, wherein said cooling system comprises:
   a chiller unit;
   conduit structure extending from said chiller unit to said at least one polymeric pouch for defining a path for the coolant fluid to travel from said chiller unit to said at least one polymeric pouch and, after passing through said at least one polymeric pouch, back to said chiller unit; and
   wherein said chiller unit is adapted to remove energy in a form of heat from the coolant fluid.

3. The apparatus of claim 1, further comprising a support structure comprising a base adapted to rest on a platform of a blade defining the metal part and at least one shelf for supporting said at least one polymeric pouch.

4. The apparatus of claim 1, wherein said at least one polymeric pouch comprises first and second polymeric pouches adapted to be positioned on opposing side surfaces of the metal part, said first and second polymeric pouches being associated with said cooling system.

5. The apparatus of claim 1, wherein the metal part comprises an airfoil of a blade and said surface comprises one of a pressure side and a suction side of said airfoil.

6. The apparatus of claim 3, wherein said support structure further comprises a shield positioned near a tip of an airfoil of the blade to protect the at least one polymeric pouch during a welding repair operation on the tip.

7. The apparatus of claim 4, further comprising a support structure comprising a base adapted to rest on a platform of a blade defining the metal part and first and second shelves for supporting respectively said first and second polymeric pouches.

8. The apparatus of claim 7, wherein said first shelf includes a curved surface having a contour that follows a contour of a corresponding side surface of an airfoil of the blade.

9. The apparatus of claim 8, wherein said support structure further comprises a shield positioned near a tip of the airfoil to protect the first and second polymeric pouches during a welding repair operation on the tip.

10. The apparatus of claim 9, wherein said support structure further comprises coupling structure for coupling said base, said first and second shelves and said shield to one another.

11. The apparatus of claim 10, further comprising structure for connecting said first polymeric pouch to at least one of said first shelf and said coupling structure and for connecting said second polymeric pouch to at least one of said second shelf and said coupling structure.

12. An apparatus for cooling an airfoil of a blade during a welding operation comprising:
    at least one polymeric pouch configured so as to be positioned adjacent a surface of the airfoil and capable of receiving a coolant fluid; and
    a cooling system adapted to circulate the coolant fluid through said at least one polymeric pouch such that energy in a form of heat is transferred from the airfoil during a welding repair operation, through said at least one polymeric pouch to said coolant fluid.

13. The apparatus of claim 12, wherein said surface comprises one of a pressure side and a suction side.

14. The apparatus of claim 13, wherein said cooling system comprises:
    a chiller unit;
    conduit structure extending from said chiller unit to said at least one polymeric pouch for defining a path for the coolant fluid to travel from said chiller unit to said at least one polymeric pouch and, after passing through said at least one polymeric pouch, back to said chiller unit; and
    wherein said chiller unit is adapted to remove energy in a form of heat from the coolant fluid.

15. The apparatus of claim 13, further comprising a support structure comprising a base adapted to rest on a platform of the blade and at least one shelf for supporting said at least one polymeric pouch.

16. The apparatus of claim 13, wherein said at least one polymeric pouch comprises first and second polymeric pouches adapted to be positioned on the respective pressure and suction sides of the airfoil, said first and second polymeric pouches being associated with said cooling system.

17. The apparatus of claim 15, wherein said support structure further comprises a shield positioned near a tip of the airfoil to protect the at least one polymeric pouch during a welding repair operation on the tip.

18. The apparatus of claim 16, further comprising a support structure comprising a base adapted to rest on a platform of the blade and first and second shelves for supporting respectively said first and second polymeric pouches.

19. The apparatus of claim 18, wherein:
    said first shelf includes a curved surface having a contour that follows a contour of the pressure side of the airfoil;
    said support structure further comprises a shield positioned near a tip of the airfoil to protect said first and second polymeric pouches during a welding repair operation on the tip; and
    said support structure further comprises coupling structure for coupling said base, said first and second shelves and said shield to one another.

20. The apparatus of claim 19, further comprising structure for connecting said first polymeric pouch to at least one of said first shelf and said coupling structure and for connecting said second polymeric pouch to at least one of said second shelf and said coupling structure.

* * * * *